(No Model.) 2 Sheets—Sheet 1.

H. H. SATER.
CULTIVATOR.

No. 420,248. Patented Jan. 28, 1890.

WITNESSES
Edwin L. Yewell
Jos. A. Ryan

INVENTOR
H. H. Sater.
By T. McCleary
Attorney.

(No Model.) 2 Sheets—Sheet 2.

H. H. SATER.
CULTIVATOR.

No. 420,248. Patented Jan. 28, 1890.

WITNESSES
Edwin L. Yewell.
Jos. A. Ryan

INVENTOR
H. H. Sater
By P. McCleary
Attorney.

UNITED STATES PATENT OFFICE.

HANS H. SATER, OF DUBUQUE, IOWA.

CULTIVATOR.

SPECIFICATION forming part of Letters Patent No. 420,248, dated January 28, 1890.

Application filed August 22, 1888. Serial No. 283,422. (No model.)

*To all whom it may concern:*

Be it known that I, HANS H. SATER, of Dubuque, in the county of Dubuque and State of Iowa, have invented certain new and useful Improvements in Cultivators; and I do hereby declare the following to be a full, clear, and exact description of the invention, such as will enable others skilled in the art to which it pertains to make and use the same.

My invention relates to cultivators, the object being to provide a cultivator with novel means for connecting the beams with the axle, and also for connecting the shovels to the beams.

The invention consists in the details of construction and combinations of parts hereinafter fully described, and pointed out in the claims.

Figure 1:
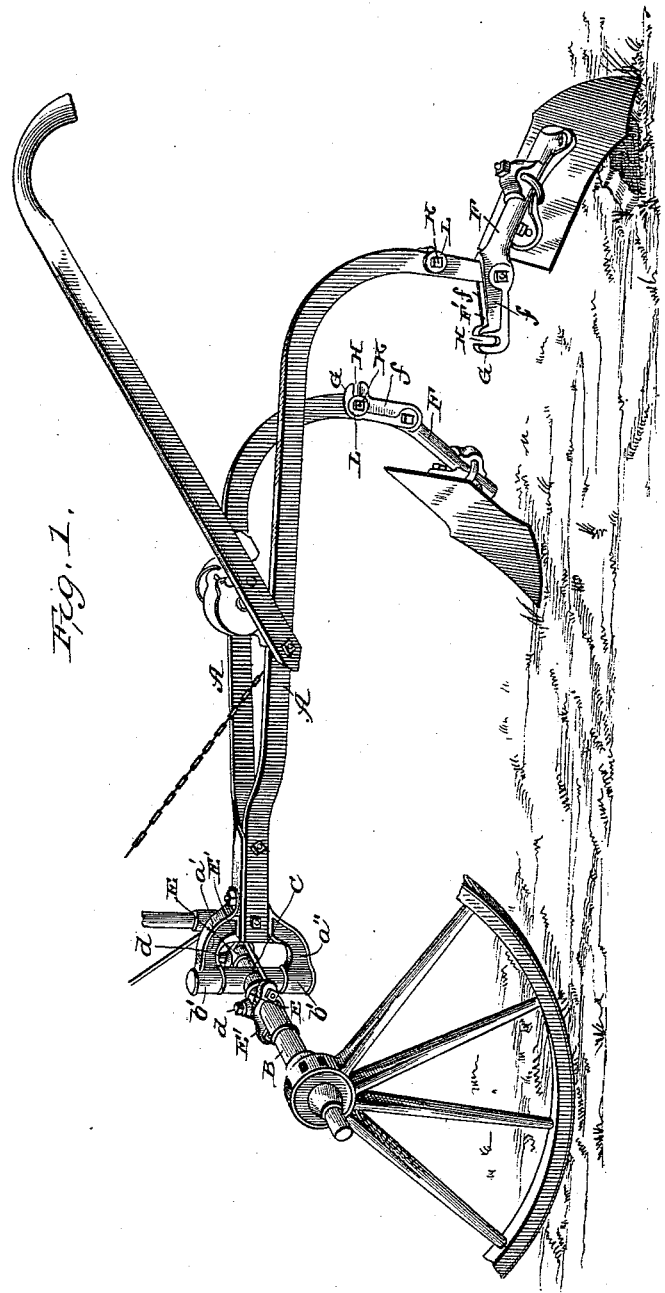
Figure 2:
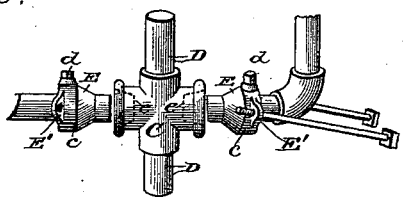
Figures 3, 4:
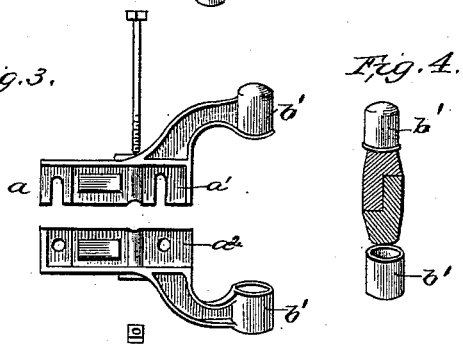
Figures 5, 6, 7:
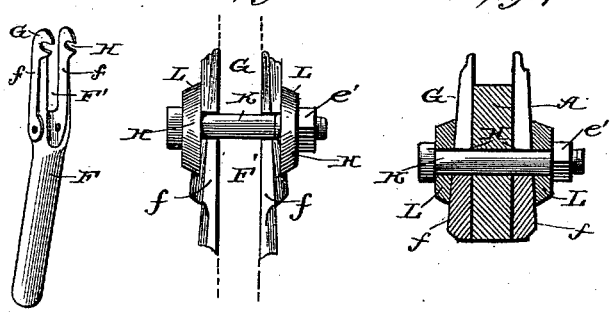
Figures 8, 9:
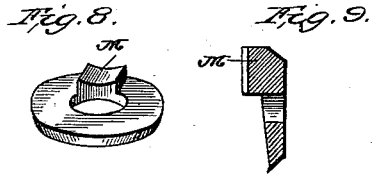

In the accompanying drawings, Figure 1 represents a perspective view of a portion of a cultivator embodying my invention. Fig. 2 represents the axle with my improved means of attaching the beams in place thereon. Figs. 3 and 4 are detail views illustrating the coupling. Fig. 5 is a perspective view of the swinging bar. Fig. 6 is a rear view of the upper part of the swinging bar embracing the beam. Fig. 7 is a horizontal sectional view of the same. Fig. 8 is a perspective view of a modification, and Fig. 9 is a sectional view of the same.

A A represent beams, which are of the usual shape and construction.

B represents an axle upon which the device is supported.

C is a hub mounted upon the axle and provided with vertical extensions D.

$a$ represents a coupling formed in two sections $a'$ and $a^2$. The rear ends of said sections are arranged to fit each other and be secured by a bolt passed through a vertically-arranged bolt-hole. The rear end of the coupling forms a straight portion, to which and upon either side the front ends of the beams are secured. The front ends $b'$ $b'$ register with each other and are adapted to receive the extension D. It will thus be seen that I provide a connection between the beams and the axle that will permit a lateral motion on the part of the beams.

To construct the hub C so that it will be capable of adjustment upon the axle, sleeves $c$ $c$ are arranged upon the axle on either side of said hub, and said sleeves are provided with clamping-nuts $d$. The ends of the hubs are beveled internally, as shown by dotted lines in Fig. 2, and designated $e$. The sleeves are beveled externally, as at E, to correspond to the bevel of the hub. In Fig. 1 the sleeves are illustrated in operative condition or clamped together, and in Fig. 2 they are shown apart.

E' represents lugs formed on the sides of the sleeves, and through which bolts pass. The bolts are provided with nuts, thus affording means for taking up slack that may occur by reason of wear or otherwise.

The mechanism for securing the shovel to the beam consists of a swinging bar F, the upper end of which is bifurcated, as at F'. The said bar is pivoted to the lower end of the beam, the beam passing between the bifurcated portions. To the lower end of said bar the shovel is secured. Each of the arms $f f$ of the portion F' is provided with jaws G and slots H near its upper end. The inner faces of the jaws G are parallel, while the outer faces are tapered toward the rear. K is a bolt passed through the beam, and is provided with washers L, whose inner faces are inclined to correspond with the inclined faces of the jaws G. The jaws G are adapted to pass between the washers L and the sides of the beam, and are clamped by adjusting the nut $e'$. To facilitate the adjusting of the bar I have devised a nut, (illustrated in Figs. 8 and 9,) which is provided with a lug M on its inclined face. This lug passes into the slot H in the jaws G. In clamping the upper end of the bar F to the beam it is clamped sufficiently tight enough to carry the shovels at an incline through the ground; but when the shovels strike an obstacle which offers more resistance than the ground the jaws will leave the beam and allow the shovel to pass rearwardly and drag upon the ground. The incline of the shovel can also be adjusted.

Having fully described my invention, what I claim as new, and desire to secure by Letters Patent, is—

1. A wheeled cultivator provided with a divided axle, a hub C, connecting the sections of said axle and capable of rotary movement therein and having vertical extensions D, and one or more cultivator-beams connecting with said extensions and capable of rotary movement on the same, substantially as and for the purposes herein set forth.

2. A wheeled cultivator provided with a divided axle, a hub C between the sections of said axle, stay-rods connecting said sections, and one or more cultivator-beams pivoted to said hub C, substantially as and for the purposes set forth.

3. A wheeled cultivator consisting of a divided axle, the sections whereof are connected together by stay-rods, a hub C between said sections and provided with vertical projections, and a divided coupling $a$, engaging with said extensions and attached to the forward portion of the cultivator-beams and constructed substantially as set forth.

4. In a wheeled cultivator, a divided axle, the sections whereof are connected by stay-rods, a hub C between the sections of said axle and having inclined chambers $e\ e$ therein, a removable inclined sleeve $c$ on each section of the axle and engaging with one of said chambers, and one or more cultivator-beams pivoted to said hub, substantially as and for the purposes herein set forth.

5. In a cultivator, a swinging arm connected to the beam having its upper portion bifurcated and provided with slotted jaws, said jaws being tapered on the outside faces, a bolt passed through the beam and provided with washers whose inner faces are tapered to correspond to the incline of the jaws, whereby the outer faces of said washers are parallel, substantially as described.

6. In a cultivator, a swinging arm connected to the beam having its upper portion bifurcated and provided with slotted jaws, said jaws being tapered on the outside faces, a bolt passed through the beam and provided with washers whose inner faces correspond to the incline of the jaws, whereby the outer faces of said washers are parallel and provided with lugs which enter the slots in the jaws, substantially as described.

In testimony whereof I have signed this specification in the presence of two subscribing witnesses.

HANS H. SATER.

Witnesses:
  W. A. LEATHERS,
  ALEXANDER SIMPLOT.